United States Patent [19]

Everts

[11] Patent Number: 4,976,093
[45] Date of Patent: Dec. 11, 1990

[54] BRAKE SYSTEM FOR ROTARY CUTTERS AND TRIMMERS

[75] Inventor: Robert G. Everts, Chandler, Ariz.

[73] Assignee: Inertia Dynamics Corporation, Chandler, Ariz.

[21] Appl. No.: 398,704

[22] Filed: Aug. 25, 1989

[51] Int. Cl.⁵ ............................................. A01D 69/00
[52] U.S. Cl. ........................................ 56/11.3; 56/239
[58] Field of Search ................... 56/11.3, 11.4, 11.7, 56/10.8, 239–243

[56] References Cited

U.S. PATENT DOCUMENTS 4,503,958  3/1985  Nishio ............................. 56/11.3 X
4,669,590  6/1987  Zindler et al. ................... 56/11.3 X

FOREIGN PATENT DOCUMENTS 0237774  9/1987  European Pat. Off. ............. 56/239
2187926  9/1987  United Kingdom .................. 56/239

Primary Examiner—Thuy M. Bui
Attorney, Agent, or Firm—Donald D. Mon

[57] ABSTRACT

A brake system for a vegetation cutter. The cutter has a boom with a proximal end and a distal end. A working head is rotatably mounted to the distal end, and a power source such as a gasoline engine, is mounted at the proximal end. A clutch is interposed between the power source and a drive shaft on the boom which drives the working head. A brake surface is concurrently driven with the drive shaft. A brake is adapted to be pressed against the brake surface to brake rotation of the drive shaft when it is applied, and to enable rotation when it is not applied.

6 Claims, 2 Drawing Sheets

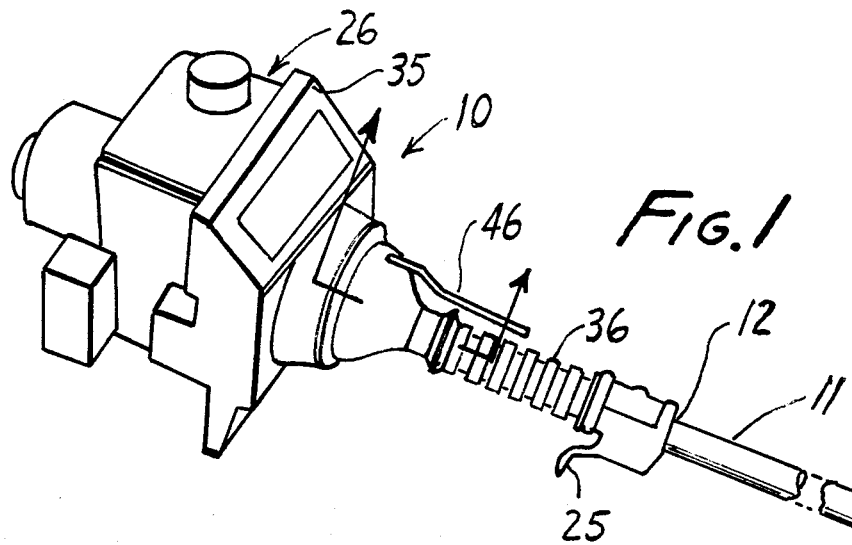
Fig. 1
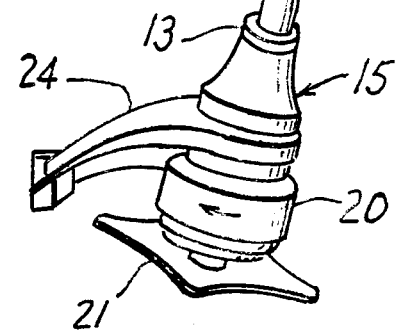
Fig. 2
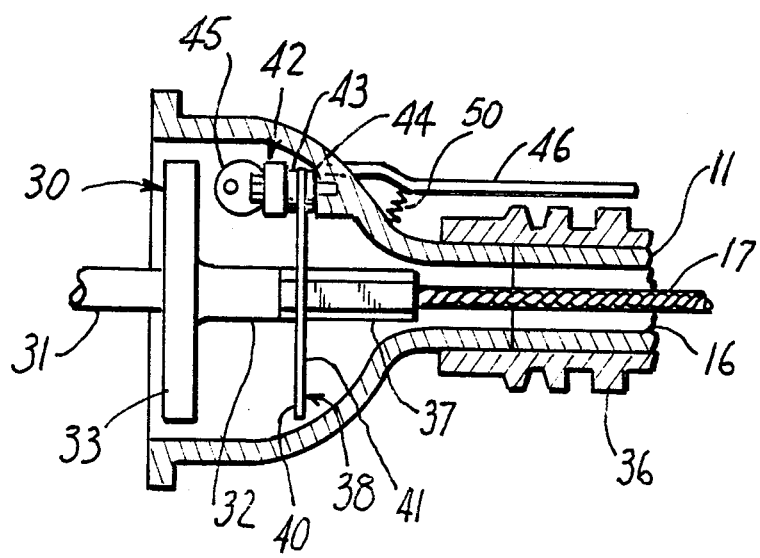

BRAKE SYSTEM FOR ROTARY CUTTERS AND TRIMMERS

FIELD OF THE INVENTION

This invention relates to a brake system for rotary blade cutters and string trimmers, used to cut vegetation.

BACKGROUND OF THE INVENTION

Hand held internal combustion engine-driven, rotary cutters and trimmers have become very popular gardening and maintenance tools. It is customary for the internal combustion engine to be placed at the proximal end of the tool, with a boom projecting from it to the distal end where a working head is mounted for rotation. The working head is usually coupled to the engine by a flexible drive shaft which passes through the boom.

Fractional horsepower gasoline engines used in these tools generally drive the working head through a centrifugal clutch which is intended to release when the engine speed is reduced to idle, and when the engine is stopped. Occasionally there may be some frictional effects in the clutch which will cause some rotation at idle. This is undesirable and can be prevented by this invention.

However, a more important consideration is the continued rotation of the working head, and especially of a heavy cutter blade as the consequence of its inertia. The working head is driven at a high speed through a low-weight cable drive. When the clutch disengages, the working head will continue to rotate unless means is provided to stop it. This invention provides such a means.

It is an object of this invention to provide a brake system which will prevent rotation of the working head either by voluntary application of the brake system, or by involuntary application wherein the brake system is activated unless released by a voluntary action of the operator such as by holding the tool in a prescribed manner.

BRIEF DESCRIPTION OF THE INVENTION

A brake system according to this invention is provided in combination with a tool which includes a boom having a proximal end and a distal end. Power means such as a fractional horsepower gasoline engine is mounted to the proximal end of the boom. A working head is mounted to the distal end of the boom. The working head rotates and carries with it a working element. In this invention the usual working element is a cutter blade for heavier vegetation such as brush, or a flailing line for lighter vegetation such as weeds and grass. There are, of course, other types of working elements, but these illustrate the invention. The tool is equipped with a handle adjacent to the engine, and a grip, usually on the boom, each to be grasped by a respective hand. These are located so as to balance the tool and make it convenient to manipulate.

A clutch, preferably a centrifugal clutch, is interposed between the engine and the flexible shaft. It will be related to a fixed structure such as the engine block or the boom as preferred.

Brake means is mounted to the fixed structure, adapted to enable or to prevent rotation of the shaft or of an appendage to the shaft which rotates with it. A brake actuator is also mounted to the fixed structure available to a hand that engages the grip.

According to one embodiment of the invention, the actuator is normally activated to prevent rotation of the flexible shaft, and is released only when a hand on the grip changes the actuator setting.

According to another embodiment of the invention, the actuator is normally not actuated and leaves the shaft free to rotate, but when actuated by a hand on the grip will prevent rotation of the shaft.

The above and other features of this invention will be fully understood from the following detailed description and the accompanying drawings, in which:

BRIEF DESCRIPTION OF THE DRAWINGS

FIG. 1 shows a vegetation cutting tool incorporating the invention;

FIG. 2 is a fragmentary cross-section taken at line 2—2 in FIG. 1 showing one embodiment of a brake system according to the invention;

DETAILED DESCRIPTION OF THE INVENTION

Figure 3:
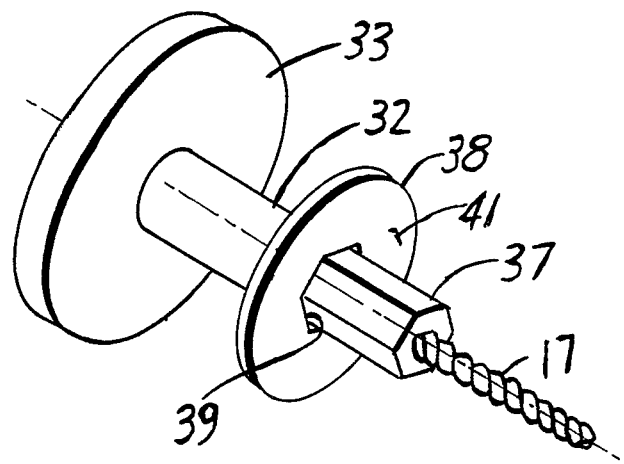
Fig. 3 is a fragmentary view of a portion of FIG. 1.

A hand-held power tool 10 for cutting vegetation is shown in FIG. 1. It includes an extended boom 11 having a proximal end 12 and a distal end 13. The distal end is farther from the operator, and mounts a working head 15.

The boom is tubular, and as shown in FIG. 2 has a central passage 16 therethrough. Usually the boom will be made of a strong lightweight metal alloy, such as an aluminum alloy. A flexible shaft 17, usually a flexible metal cable, extends through passage 16 to drive the working head. It is appropriately supported by bearings in the boom.

The working head includes a rotary mount 20 rotatably attached to the distal end of the boom. A conventional bearing assembly will be provided to enable the mount to rotate. It will be drivingly attached to the distal end of the flexible shaft for that purpose.

In FIG. 1, the working head is shown carrying a sharp-edged cutter 21. This cutter is a rigid plate with an irregularly shaped periphery for cutting relatively heavy vegetation such as brush. This is only one type of working element. Equally suitable is a flexible flail made of plastic or of metal-reinforced plastic which is rotatably flailed for cutting purposes. Generally this "line trimmer" will be used for cutting lighter vegetation such as grass and weeds. Both the flailing line and the rotary blade are referred to as "working elements".

A guard 24 is fixed to the distal end of the boom to protect the operator from contact with the working element, and to deflect flying debris.

A throttle lever 25 at the proximal end of the boom is controllably connected to the throttle (not shown) of a schematically illustrated power means 26. The illustrated power means 26 is a fractional horsepower 2-cycle gasoline engine. Other types of engines and motors may instead by used, for example electric motors or 4-cycle engines, but this invention finds its most common applications with 2-cycle gasoline engines. These engines are often run at idling speeds, and are frequently shut down. In both cases it is desirable to prevent the working head from coasting to a stop. The power means is drivingly connected to the flexible shaft through a centrifugal clutch 30. This clutch is shown only schematically for the reason that it is completely conventional, and its details are not essential to an understanding of the invention. Input shaft 31 to the clutch is the output shaft of the engine. Output shaft 32 from the clutch is characteristically a rotating part of the case 33 of the clutch on its output side. Classical clutch engagement means (not shown), preferably centrifugal, form part of the clutch to transmit power.

The tool has a handle 35 at the power means for lifting this heavier part of the tool. A hand grip 36 is formed around and on the boom where the other hand will grip the tool. The handle and the grip will be located so as to give a good balance for manipulating the tool. The grip and the throttle lever are appropriately located relative to one another.

The presently-preferred form of brake system is shown in FIGS. 2 and 3. Output shaft 32 has a non-circular section 37, preferably hexagonal. A brake disc 38 has a matching non-circular aperture 39 therethrough so it can closely fit onto the output shaft and be driven by it. The disc has a pair of flat disc-shaped braking surfaces 40, 41. A brake caliper 42 has a pair of brake shoes 43, 44 so disposed and arranged as to be pressed against respective surfaces 40 and 41. The caliper is conventional and cams around a pivot 45. A handle 46 is pivoted to pivot 45 and projects beyond non-rotating housing 36 to overhang part of the grip.

Depending on the type of actuation desired, the grip can be adapted normally to apply the brake, or normally to leave the brake not applied. This is accomplished by appropriate arrangement of the handle and its linkage to the brake. If the bias spring is in compression between the housing and the brake lever, it will bias the brake "off" and the brake will not impede shaft rotation. The brake would be applied by squeezing the brake handle toward the grip. This is one mode of operation.

This usually preferred arrangement is shown in FIG. 2, where spring 50 is in compression and tends to bias handle 35 away from the grip. This normally applies the brake. The handle is placed where it will be pressed by the user's hand when he intends for the tool to cut. This is a species of a dead man's hand, where even if the engine idles, there will be no cutting output unless there is a conscious pressure on the handle, with the hand in an operating alignment. If the operator desires the brake to be applied, he merely releases the handle. When he lays the tool down, the brake will automatically be applied, whether the engine idles or is stopped.

Of course the opposite arrangement could be made, in which the cam arrangement would be reversed, such that the brake is off when the handle is not pressed, and will be applied when it is.

Figure 4:
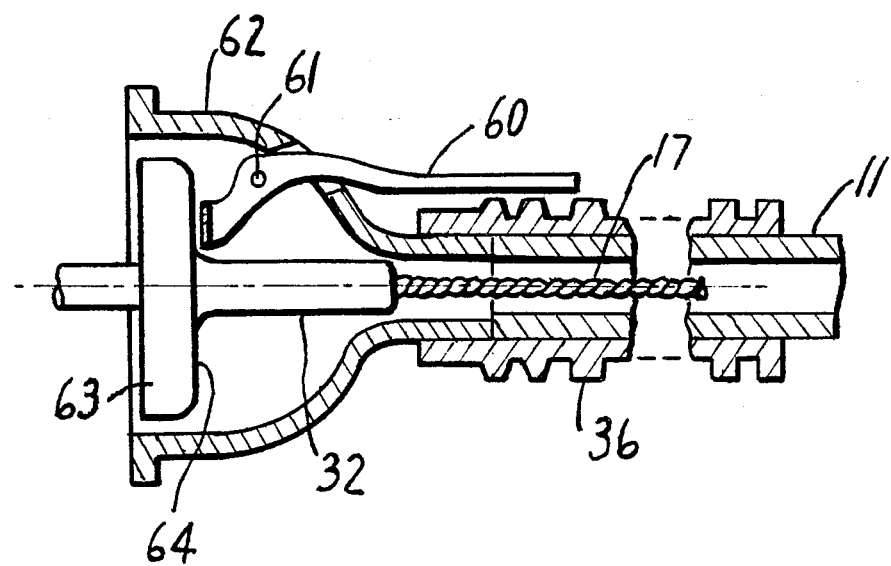
FIG. 4 is a fragmentary axial cross-section of another embodiment of the invention.

As to the latter normally off condition, FIG. 4 shows another arrangement. Here a handle 60 is pivotally mounted at pivot 61 to fixed structure 62. A clutch drum 63 has a braking surface 64. A brake shoe 65 on the lever is adapted to be pressed against the clutch drum when handle 60 is pressed toward grip 36. This is a "conscious" brake, which is not applied unless the user who holds grip 36 decides to apply the brake. It is another species of the brake system shown in FIG. 2, biased oppositely. Again, the bias could be reversed to a normally brake-on condition.

This invention thereby provides both conscious and unconscious means to apply a brake to a vegetation cutter, providing a safety feature for either mode of operation.

This invention is not to be limited to the embodiments shown in the drawings and described in the description, which are given by way of example and not of limitation, but only in accordance with the scope of the appended claims.

I claim:

1. A brake system for a vegetation cutter, said vegetation cutter having a boom with a proximal end and a distal end, power means mounted to the proximal end, a working head rotatably mounted to the boom at the distal end, a drive shaft in said boom drivingly connected to the working head, and a clutch interposed between said power means and said drive shaft, said cutter including a grip for being held by a hand of the user, said brake comprising:

a brake surface concurrently driven with the shaft, a handle overhanging part of said grip, and brake means operatively connected to said handle adapted to be pressed against said brake surface to brake rotation of said drive shaft when applied, and to enable said rotation when not applied, respective to a handle position.

2. A brake system according to claim 1 in which said handle is biased away from said grip.

3. A brake system according to claim 2 in which said handle, when so biased, applies the brake.

4. A brake system according to claim 2 in which said handle when so biased, releases said brake.

5. A brake system according claim 2 in which said braking surface is formed on a disc driven with said drive shaft.

6. A brake system according to claim 2 in which said braking surface is formed on a rotating portion of said clutch.

* * * * *